US008647896B2

(12) United States Patent
Sakai

(10) Patent No.: US 8,647,896 B2
(45) Date of Patent: Feb. 11, 2014

(54) PROCESS FOR PRODUCING A SUBSTRATE FOR A LIQUID EJECTION HEAD

(75) Inventor: Toshiyasu Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 13/411,896

(22) Filed: Mar. 5, 2012

(65) Prior Publication Data

US 2012/0231565 A1 Sep. 13, 2012

(30) Foreign Application Priority Data

Mar. 9, 2011 (JP) ................................ 2011-051669

(51) Int. Cl.
*B44C 1/22* (2006.01)
*G11B 5/127* (2006.01)

(52) U.S. Cl.
USPC ......... 438/21; 438/694; 257/E21.231; 216/27

(58) Field of Classification Search
None
See application file for complete search history.

(56) References Cited

U.S. PATENT DOCUMENTS

| | | | | |
|---|---|---|---|---|
| 7,438,392 | B2 | 10/2008 | Vaideeswaran et al. | |
| 2009/0065472 | A1* | 3/2009 | Asai et al. | 216/27 |
| 2009/0212008 | A1* | 8/2009 | Uyama et al. | 216/27 |
| 2009/0314742 | A1* | 12/2009 | Kishimoto et al. | 216/27 |
| 2012/0069094 | A1* | 3/2012 | Okano et al. | 347/54 |
| 2012/0088317 | A1* | 4/2012 | Kishimoto et al. | 438/21 |

FOREIGN PATENT DOCUMENTS

| | | |
|---|---|---|
| JP | 2009-061663 A | 3/2009 |

* cited by examiner

*Primary Examiner* — Zandra V. Smith
*Assistant Examiner* — Pamela E Perkins
(74) *Attorney, Agent, or Firm* — Fitzpatrick, Cella, Harper & Scinto

(57) ABSTRACT

Provided is a process for producing a substrate for a liquid ejection head, including forming a liquid supply port in a silicon substrate, the process including the steps of (a) forming an etch stop layer at a portion of a front surface of the silicon substrate at which portion the liquid supply port is to be formed; (b) performing dry etching using a Bosch process from a rear surface side of the silicon substrate up to the etch stop layer with use of an etching mask formed on a rear surface of the silicon substrate to thereby form the liquid supply port; and (c) simultaneously removing the etch stop layer and a deposition film formed inside the liquid supply port.

7 Claims, 4 Drawing Sheets

PROCESS FOR PRODUCING A SUBSTRATE FOR A LIQUID EJECTION HEAD

BACKGROUND OF THE INVENTION

1. Field of the Invention

The present invention relates to a process for producing a substrate for a liquid ejection head.

2. Description of the Related Art

An ink jet recording method has such an advantage that only a negligibly small noise is generated during recording, and an advantage that high-speed recording can be performed without subjecting plain paper to special processing.

Further, among ink jet recording heads, an ink jet recording head capable of ejecting ink droplets in a perpendicular direction with respect to a base member on which an ejection energy generating element is formed is referred to as "side-shooter type recording head". In such a side-shooter type recording head, ink supply to an ink flow path is performed via a through-hole provided in the base member (also called "element substrate") on which a thermoelectric conversion element corresponding to the ejection energy generating element is formed.

As measures of forming an ink supply port in the element substrate of the ink jet recording head of this type, there have been proposed a method using a drill or a laser, and methods such as sandblasting and crystal anisotropic etching.

In U.S. Pat. No. 7,438,392, there is disclosed a method so-called a Bosch process in which etching of the substrate and coating of an etched side surface are repeated to form the through-hole in the substrate.

Through use of the Bosch process to form the ink supply port, the ink supply port can substantially perpendicularly be formed, and hence the chip size can be smaller than that in the case where the ink supply port is formed by crystal anisotropic etching.

Further, in Japanese Patent Application Laid-Open No. 2009-61663, there is disclosed a method in which an etch stop layer is provided when the ink supply port is formed by the Bosch process.

As in the technologies described in U.S. Pat. No. 7,438,392 and Japanese Patent Application Laid-Open No. 2009-61663, with a substantially-perpendicular ink supply port, the chip size can be reduced.

When the ink supply port is formed with use of the etch stop layer and the Bosch process as described in U.S. Pat. No. 7,438,392 and Japanese Patent Application Laid-Open No. 2009-61663, a step of removing the etch stop layer is necessary after dry etching is completed. Note that, the etch stop layer is generally removed by wet etching after the dry etching is completed.

Further, the Bosch process is performed by repeating a step of etching and a step of deposition, but eventually, a deposited film (hereinafter, also referred to as deposition film) remains on a side wall of the ink supply port. When the ink jet recording head is produced under such a condition that this deposition film is adhered on the side wall, printing performance may be reduced.

The deposition film that has adhered on the side wall of the ink supply port can be removed through immersion in HFE or the like, but similarly to the above-mentioned step of removing the etch stop layer, addition of other steps is required.

SUMMARY OF THE INVENTION

Thus, it is an object of the present invention to provide a process for efficiently producing a substrate for a liquid ejection head including a liquid supply port, which is formed substantially perpendicularly to a substrate surface and has a side wall from which a deposition film is removed.

According to an exemplary embodiment of the present invention, there is provided a process for producing a substrate for a liquid ejection head, including forming a liquid supply port in a silicon substrate, the process including the steps of: (a) forming an etch stop layer at a portion of a front surface of the silicon substrate at which portion the liquid supply port is to be formed; (b) performing dry etching using a Bosch process from a rear surface side of the silicon substrate up to the etch stop layer with use of an etching mask formed on a rear surface of the silicon substrate to thereby form the liquid supply port; and (c) simultaneously removing the etch stop layer and a deposition film formed inside the liquid supply port.

Further features of the present invention will become apparent from the following description of exemplary embodiments with reference to the attached drawings.

DESCRIPTION OF THE EMBODIMENTS

Hereinafter, embodiments of the present invention are described with reference to the drawings.

Note that, in the following description, a substrate for an ink jet head is exemplified as an application example of the present invention, but the applicable range of the present invention is not limited thereto. Other than the substrate for an ink jet head, the present invention may also be applied to a process for producing a substrate for a liquid ejection head for biochip production or electronic circuit printing. Examples of the liquid ejection head may include, other than the ink jet recording head, a head for color filter production.

First Embodiment

Figure 3:
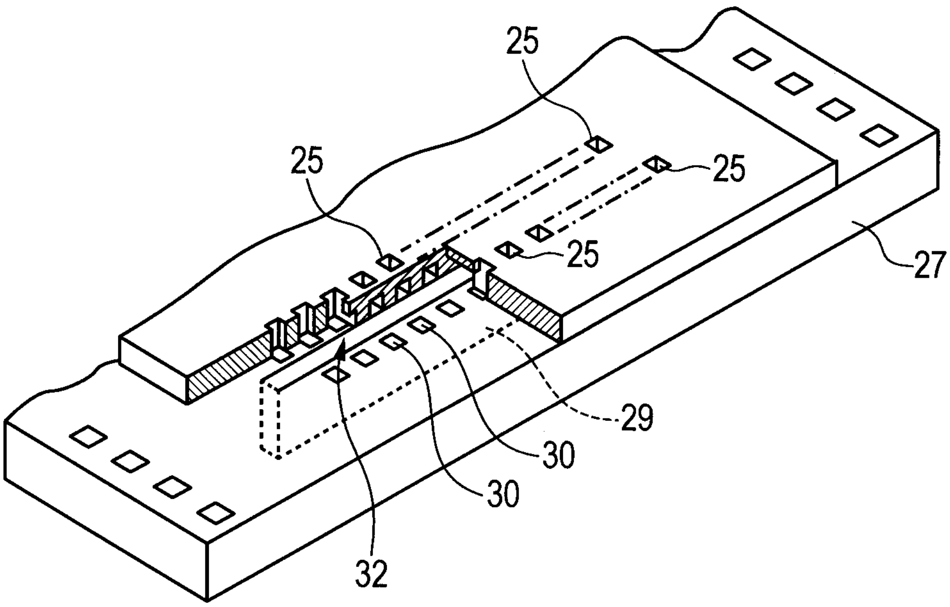
FIG. 3 is a schematic perspective view of an ink jet recording head including a substrate for an ink jet head produced in the first embodiment of the present invention.

A structure of a substrate for an ink jet head to be produced in a producing process according to a first embodiment of the present invention is described first. FIG. 3 is a schematic perspective view of an ink jet recording head including the substrate for an ink jet head produced by the producing process of this embodiment.

The substrate for an ink jet head as a substrate for a liquid ejection head is mainly formed of a silicon substrate 27, and includes multiple ejection energy generating elements (for example, heaters) 30 on a front surface side of the silicon substrate 27. On the substrate for an ink jet head, an ink flow path (liquid flow path) 32 and an ink ejection port (ejection port) 25 are provided. In the substrate for an ink jet head, an ink supply port (liquid supply port) 29 which passes through the silicon substrate 27 and is opened at the front surface and a rear surface of the silicon substrate is formed substantially perpendicularly to a surface direction of the substrate.

Next, a process for producing the substrate for an ink jet head illustrated in FIG. 3 is described.

Figure 1A:
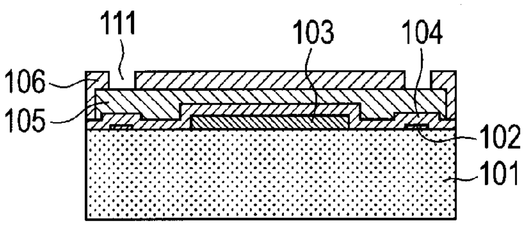
FIGS. 1A, 1B, 1C, 1D, 1E, 1F, 1G, 1H and 1I are sectional views illustrating steps of a process for producing a substrate for an ink jet head according to a first embodiment of the present invention.

FIG. 1A illustrates a silicon substrate 101 on which a heater 102 as the ejection energy generating elements are arranged on a front surface side of the silicon substrate 101. Further, an etch stop layer 103 is formed on the front surface of the silicon substrate 101. Further, an insulating layer 104 is formed on the heater 102, the etch stop layer 103, and the silicon substrate 101.

The etch stop layer 103 is formed at a portion at which the ink supply port is to be formed, and functions as a stop layer for dry etching performed in a subsequent step. Further, the etch stop layer is preferred to be formed so that an upper opening of the ink supply port to be formed by dry etching in the subsequent step reaches an inner side of the etch stop layer.

As a material for the etch stop layer 103, for example, aluminum or an alloy containing aluminum as a main component (for example, aluminum-copper alloy) may be used.

As the etch stop layer 103, for example, an aluminum film of 500 nm may be formed by sputtering.

Further, as the insulating layer 104, for example, an oxide film of 700 nm may be formed by plasma CVD.

Further, the thickness of the silicon substrate 101 is, for example, 200 μm.

Further, on the insulating layer 104, a close-contact layer (not shown) formed of a polyether amide resin layer, and a flow path forming material 105 which becomes a mold of the ink flow path are formed. Further, a covering resin layer 106 is formed so as to cover the flow path forming material 105.

The covering resin layer 106 is a member for forming an ink flow path 112 and an ink ejection port 111, and is made of, for example, a photo-sensitive resin.

As a material for the flow path forming material 105, for example, a positive type resist may be used.

Figure 1B:
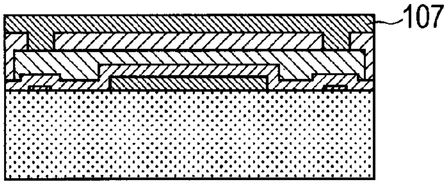

Next, as illustrated in FIG. 1B, a protection resist 107 for protecting the surface is formed.

As the protection resist 107, for example, OBC (trade name) manufactured by TOKYO OHKA KOGYO CO., LTD. may be used. Alternatively, as the protection resist 107, other commercially-available positive type photoresists may be used.

Figure 1C:
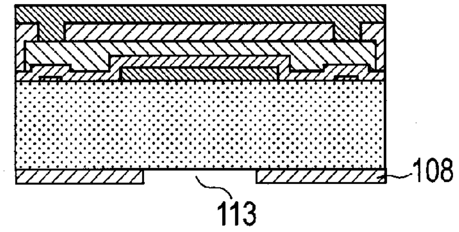

Next, as illustrated in FIG. 1C, on a rear surface of the silicon substrate 101, an etching mask 108 for forming the ink supply port is formed by anisotropic dry etching performed in a subsequent step.

Specifically, for example, a photoresist OFPR (trade name) manufactured by TOKYO OHKA KOGYO CO., LTD. may be applied and then exposure and development may be performed, to thereby form the etching mask 108 including an opening portion 113.

Figure 1D:
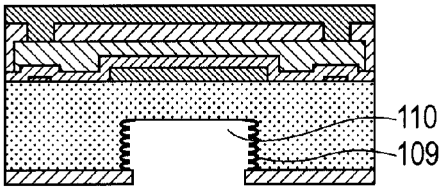
Figure 1E:
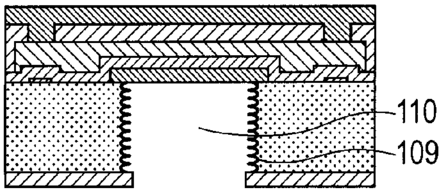

Next, as illustrated in FIGS. 1D and 1E, dry etching is performed from the rear surface side (lower side in the figures) of the silicon substrate 101 up to the etch stop layer 103. In this manner, an ink supply port 110 is formed in the silicon substrate 101. A Bosch process is used for the dry etching.

The dry etching using the Bosch process is performed with, for example, an ICP etcher (model number 601E) manufactured by Alcatel Co. The dry etching using the Bosch process can be performed by alternately repeating an etching processes using $SF_6$ and a deposition process using $C_4F_8$.

As a result of the dry etching using the Bosch process, on a side wall of the ink supply port 110, that is, inside the liquid supply port, a wave-shaped irregularity called a scallop pattern is formed, and a deposition film 109 is formed along the scallop pattern.

Figure 1F:
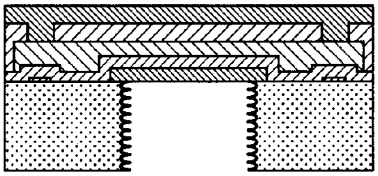

Next, as illustrated in FIG. 1F, the etching mask 108 formed on the rear surface of the silicon substrate 101 is removed.

For example, a separating liquid may be used for removal of the etching mask 108. As the separating liquid, for example, remover 1112A (trade name) manufactured by Shipley Far East Co. may be used.

Figure 1G:
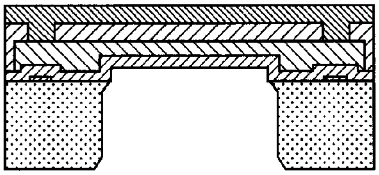

Next, as illustrated in FIG. 1G, the etch stop layer 103 and the deposition film 109 adhering on the side wall of the ink supply port are simultaneously removed.

As a method of simultaneously removing the etch stop layer 103 and the deposition film 109, a method of immersing the substrate into a remover solution can be employed. As the remover solution, a solution capable of dissolving the etch stop layer and etching the silicon substrate is preferred.

As the remover solution, tetramethylammonium hydroxide (TMAH) or KOH may be used.

In this embodiment, for example, the substrate is immersed into a 22 wt % solution of TMAH for 30 minutes, to thereby simultaneously remove the etch stop layer 103 and the deposition film 109.

Here, the shape change of the etch stop layer 103 and the vicinity thereof during the step illustrated in FIG. 1G is schematically illustrated in FIGS. 2A to 2D.

Figure 2A:
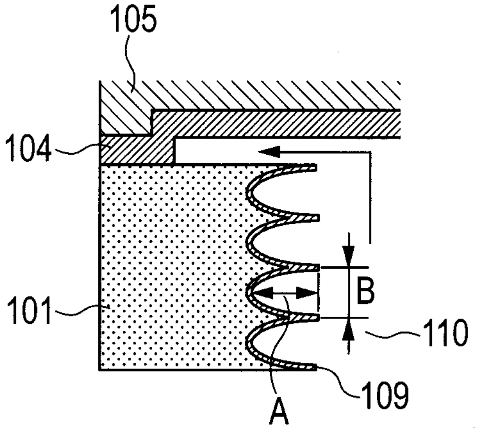
FIGS. 2A, 2B, 2C and 2D are sectional views illustrating a shape change of a liquid supply port in the step illustrated in FIG. 1G.

In FIG. 2A, the depth A of the scallop pattern is, for example, about 0.1 μm to 2 μm, which corresponds to the side etching amount in the etching step. Further, the distance B between adjacent protruding portions of the scallop pattern is, for example, about 1 μm to 10 μm, which corresponds to the etching amount in the etching step. The values A and B are both affected by the opening ratio, the size, and the etching condition of the pattern. The depth and the distance in the scallop pattern of this embodiment are, for example, about 0.5 μm and about 1.5 μm, respectively.

As illustrated in FIG. 2A, during immersion into TMAH, the removal of the etch stop layer 103 made of aluminum progresses first (FIG. 2A).

Next, due to the removal of the etch stop layer 103, the etching of the silicon substrate 101 by TMAH progresses from the front surface side. In order to facilitate the progress of etching from the front surface side of the silicon substrate as described above, the etching mask 108 and the etch stop layer 103 are desired to be formed so that the ink supply port 110 formed by dry etching reaches an inner region of the etch stop layer 103.

Figure 2B:
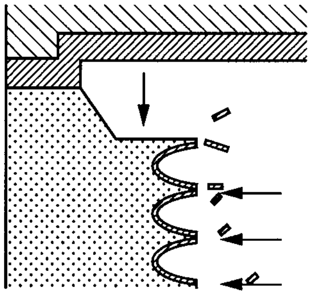

Further, the etching of the silicon substrate 101 also progresses from the side wall of the ink supply port 110, and thus the deposition film 109 is removed as in the so-called lift off process. This represents that, because the covering property of the deposition film 109 is not sufficient with respect to the side wall of the ink supply port 110, the etching by the TMAH solution progresses also from the side wall of the ink supply port 110 (FIG. 2B).

Figure 2C:
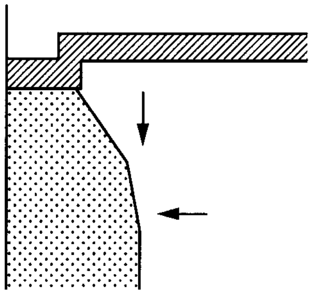
Figure 2D:
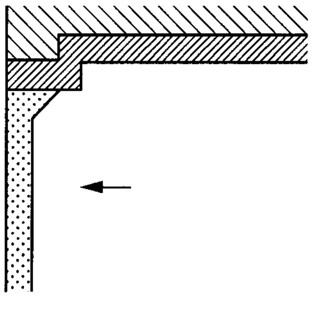

After that, as illustrated in FIGS. 2C and 2D, the etching of the silicon substrate 101 progresses to remove the deposition film 109.

Figure 1H:
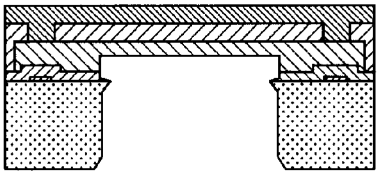

Next, as illustrated in FIG. 1H, a part of the insulating layer 104 is removed. In this embodiment, for example, P—SiO may be removed with use of buffered hydrogen fluoride (BHF).

Figure 1I:
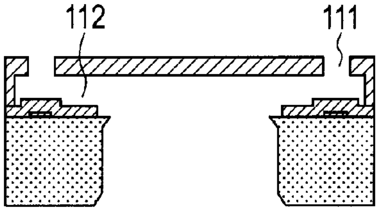

Next, as illustrated in FIG. 1I, the protection resist 107 and the flow path forming material 105 are removed.

Here, in the description above, as illustrated in FIG. 1F, the substrate is immersed in the TMAH solution under such a condition that silicon on the rear surface of the silicon substrate 101 is exposed. Therefore, the thickness of the silicon substrate 101 may reduce by about 10 μm to 30 μm. In order to avoid the reduction of the thickness of the silicon substrate 101, an oxide film may be formed on the rear surface of the silicon substrate.

Further, owing to the anisotropic property of the silicon substrate 101 with respect to the TMAH solution, the shape of the ink supply port after the deposition film is removed is as illustrated in FIG. 1G. At this time, the dimension of the ink supply port 110 is slightly enlarged, but the initial ink supply port dimension may be set in consideration of this enlargement. Further, in order to minimize the enlargement of the ink supply port dimension, in FIG. 1G, a 10 wt % solution of TMAH may be used. The 10 wt % solution of TMAH is known to have a slower etching rate in a (110) direction than the 22 wt % solution of TMAH. Therefore, the dimension change of the ink supply port 110 after the etch stop layer 103 and the deposition film 109 are removed can be reduced.

Further, in FIG. 1E, through addition of a step of etching the deposition film 109, the etching from the side wall of the ink supply port 109 in FIG. 1G can progress more easily. At this time, after the ink supply port 109 is caused to reach the etch stop layer 103 by the Bosch process and completion of the etching is confirmed by end-point detection and the like, a dry etching step using plasma containing $O_2$ as a main component is performed by the same apparatus, to thereby reduce the thickness of the deposition film 109. With this, the covering property of the deposition film 109 with respect to the scallop pattern is reduced, and the etching by TMAH can progress more easily. In order to completely remove the deposition film by dry etching, it is necessary to perform etching at high temperature. However, as in this embodiment, when the ink supply port is formed after the ink flow path wall and the ink ejection port are formed, dry etching at high temperature is difficult. However, it is enough to reduce the covering property of the deposition film 109 with respect to the scallop pattern, and hence reducing the thickness of the deposition film 109 by dry etching at low temperature which does not affect the ink flow path wall and the ink ejection port can promote the progress of the etching by TMAH.

Second Embodiment

Hereinafter, a second embodiment of the present invention is described with reference to FIGS. 4A to 4J. In the first embodiment, a method of forming the ink supply port through use of the Bosch process to a relatively thin silicon substrate (for example, about 200 μm) is described. When the silicon substrate is thin (for example, about 300 μm or smaller), a countermeasure in production against deflection of the silicon substrate is necessary in some cases. In view of this, in this embodiment, the thickness of the entire silicon substrate is secured and only a necessary region is formed to have a thickness which can be processed by the Bosch process, to thereby solve the production problem.

Figure 4A:
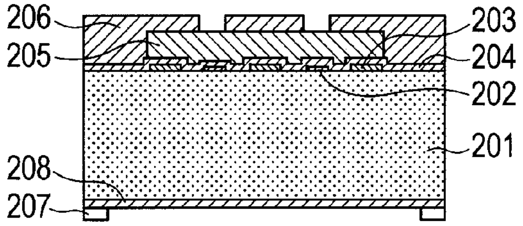
FIGS. 4A, 4B, 4C, 4D, 4E, 4F, 4G, 4H, 4I and 4J are sectional views illustrating steps of a process for producing a substrate for an ink jet head according to a second embodiment of the present invention.

In FIG. 4A, a heater 202 and an etch stop layer 203 are formed on a front surface of a silicon substrate 201. Further, an insulating layer 204 is formed on the silicon substrate 201, the heater 202, and the etch stop layer 203.

As the etch stop layer 203, for example, an aluminum film of 500 nm may be formed by sputtering. As the insulating layer 204, for example, an oxide film of 700 nm can be formed by plasma CVD. The thickness of the silicon substrate 201 is, for example, 625 μm.

Further, a rear surface oxide film 208 is formed on a rear surface of the silicon substrate. The thickness of the rear surface oxide film 208 is, for example, 600 nm. The rear surface oxide film 208 may be formed by, for example, thermal oxidation of the silicon substrate.

Further, on the front surface side of the silicon substrate 201, a close-contact layer (not shown) formed of a polyether amide resin layer, a flow path forming material 205 which becomes a mold of an ink flow path, and a covering resin layer 206 for forming a flow path wall and an ink ejection port are formed.

Further, on the rear surface side of the silicon substrate 201, a mask for a common ink supply port (mask for a common liquid supply port) 207 formed of a polyether amide resin layer is formed.

Figure 4F:
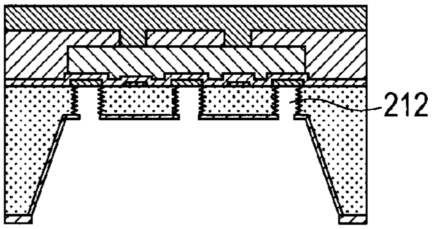
Figure 4B:
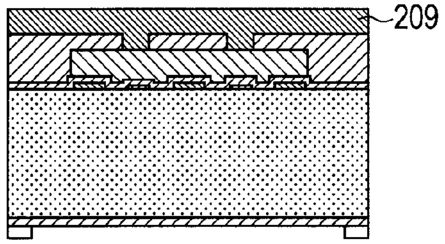

Next, as illustrated in FIG. 4B, a protection resist 209 for protecting the surface from an alkaline solution is formed.

As the protection resist 209, for example, OBC (trade name) manufactured by TOKYO OHKA KOGYO CO., LTD. may be used. Alternatively, other commercially-available positive type photoresists or other materials may be used.

Figure 4G:
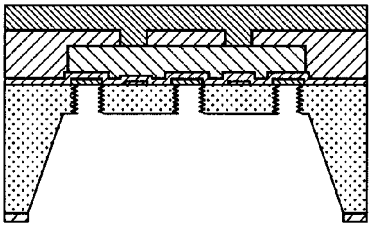
Figure 4C:
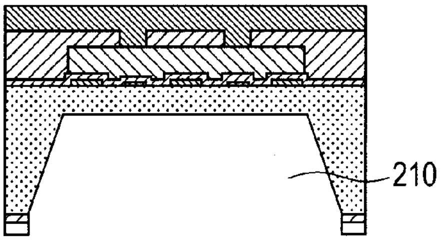

Next, as illustrated in FIG. 4C, crystal anisotropic etching is performed from the rear surface side of the silicon substrate, to thereby form a common ink supply port (common liquid supply port) 210.

Specifically, for example, the silicon substrate is immersed in a 22 wt % solution of TMAH at a temperature of 83° C. for 12 hours to form the common ink supply port 210. At this time, the distance from the rear surface of the silicon substrate to a bottom flat surface of the common ink supply port 210 is, for example, 500 μm.

Figure 4H:
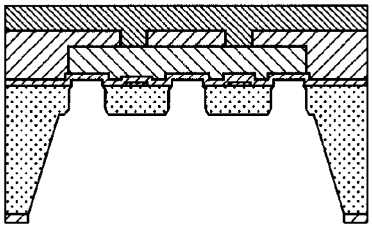
Figure 4D:
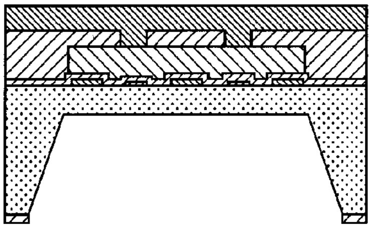

Next, as illustrated in FIG. 4D, the mask for a common ink supply port 207 formed on the rear surface of the silicon substrate is removed.

Figure 4I:
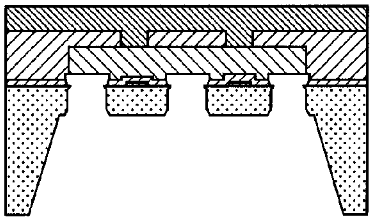
Figure 4E:
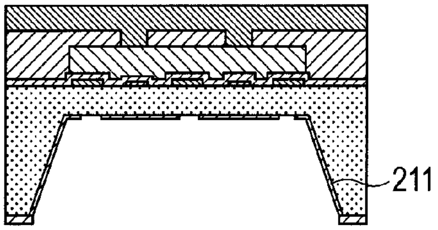

Next, as illustrated in FIG. 4E, an etching mask 211 for forming the ink supply port is formed on the rear surface of the silicon substrate including the common ink supply port.

Specifically, for example, after a photo-sensitive material is uniformly applied with use of a spray device, a pattern including an opening portion corresponding to the ink supply port is formed by a rear surface exposure device, to thereby form the etching mask 211. As the photo-sensitive material, for example, AZP4620 (trade name, manufactured by AZ Electronic Materials Ltd.) may be used. Further, as the spray device, for example, EVG150 (trade name, manufactured by EV Group) may be used.

Next, as illustrated in FIG. 4F, with use of the etching mask 211, anisotropic dry etching is performed, to thereby form an ink supply port 212 in the silicon substrate 201.

Next, as illustrated in FIG. 4G, the etching mask 211 formed on the rear surface of the silicon substrate 201 is removed.

The etching mask 211 may be removed with use of, for example, remover 1112A (trade name) manufactured by Shipley Far East Ltd.

Next, as illustrated in FIG. 4H, an aluminum film serving as the etch stop layer 203 and a deposition film adhered on the side wall of the ink supply port 212 are simultaneously removed.

As a method of simultaneously removing the etch stop layer 203 and the deposition film, a method of immersion into a remover solution can be employed. As the remover solution, a solution capable of dissolving the etch stop layer and etching the silicon substrate is preferred.

Specifically, for example, immersion into a 22 wt % solution of TMAH for 30 minutes can simultaneously remove the etch stop layer 203 and the deposition film.

In this embodiment, the rear surface oxide film 208 is formed on the rear surface side of the silicon substrate 201, and hence the thickness of the silicon substrate 201 is not reduced.

Next, as illustrated in FIG. 4I, a part of the insulating layer 204 and the rear surface oxide film 208 are removed. The rear surface oxide film 208 can be removed with use of, for example, BHF.

Figure 4J:
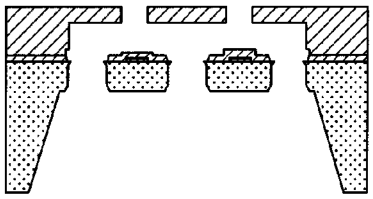

Next, as illustrated in FIG. 4J, the protection resist 209 and the flow path forming material 205 are removed.

According to the present invention, it is possible to efficiently produce a substrate for a liquid ejection head including a liquid supply port, which is formed substantially perpendicularly to the substrate surface and has a side wall from which a deposition film is removed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-051669, filed Mar. 9, 2011, which is hereby incorporated by reference herein in its entirety.

What is claimed is:

1. A process for producing a substrate for a liquid ejection head, including forming a liquid supply port in a silicon substrate, the process comprising the steps of:

(a) forming an etch stop layer at a portion of a front surface of the silicon substrate at which portion the liquid supply port is to be formed, wherein the etch stop layer is made of aluminum;

(b) performing dry etching using a Bosch process from a rear surface side of the silicon substrate up to the etch stop layer with use of an etching mask formed on a rear surface of the silicon substrate to thereby form the liquid supply port, wherein in the Bosch process an etching processes and a deposition process are repeated; and (c) removing the etch stop layer and a deposition film formed inside the liquid supply port by the deposition process.

2. The process for producing a substrate for a liquid ejection head according to claim 1, wherein the step (c) comprises immersing the silicon substrate into a remover solution to thereby remove the etch stop layer and the deposition film.

3. The process for producing a substrate for a liquid ejection head according to claim 2, wherein the remover solution is a solution which is capable of dissolving the etch stop layer and etching the silicon substrate.

4. The process for producing a substrate for a liquid ejection head according to claim 1, wherein TMAH is used as a liquid for removing the etch stop layer and the deposition film.

5. The process for producing a substrate for a liquid ejection head according to claim 1, further comprising, prior to the step (b):

forming a mask for a common liquid supply port on the rear surface of the silicon substrate;

performing crystal anisotropic etching with use of the mask for a common liquid supply port to thereby form a common liquid supply port; and forming the etching mask having an opening at a bottom portion of the common liquid supply port on the rear surface of the silicon substrate.

6. The process for producing a substrate for a liquid ejection head according to claim 1, wherein the etching mask is formed so that the liquid supply port formed in the step (c) reaches an inner side of the etch stop layer.

7. The process for producing a substrate for a liquid ejection head according to claim 1, further comprising, after the step (b) and prior to the step (c), etching the deposition film formed inside the liquid supply port to reduce the deposition film.

* * * * *